(12) United States Patent
Fahrer et al.

(10) Patent No.: US 10,760,719 B2
(45) Date of Patent: Sep. 1, 2020

(54) FIBERGLASS PIPE JOINTING METHODS AND SYSTEMS

(71) Applicant: FUTURE PIPE INDUSTRIES GROUP LIMITED, Dubai (AE)

(72) Inventors: Alwin Fahrer, Dubai (AE); Naveen Alva, Dubai (AE); Jerald Sarmiento, Dubai (AE); Kees Rookus, Hardenberg (NL)

(73) Assignee: Future Pipe Industries Group Limited, Dubai (AE)

( * ) Notice: Subject to any disclaimer, the term of this patent is extended or adjusted under 35 U.S.C. 154(b) by 0 days.

(21) Appl. No.: 13/686,451

(22) Filed: Nov. 27, 2012

(65) Prior Publication Data

US 2013/0140811 A1 Jun. 6, 2013

Related U.S. Application Data

(60) Provisional application No. 61/564,046, filed on Nov. 28, 2011.

(51) Int. Cl.

| *F16L 13/10* | (2006.01) |
|---|---|
| *F16L 13/11* | (2006.01) |
| *B29C 65/00* | (2006.01) |
| *B29C 65/54* | (2006.01) |

(Continued)

(52) U.S. Cl.
CPC .......... *F16L 13/103* (2013.01); *B29C 65/483* (2013.01); *B29C 65/542* (2013.01); *B29C 66/1162* (2013.01); *B29C 66/5221* (2013.01); *B29C 66/721* (2013.01); *B29C 66/73941* (2013.01); *F16L 13/116* (2013.01); *B29C 65/8246* (2013.01); *B29C 66/71* (2013.01); *B29C 66/7212* (2013.01)

(58) Field of Classification Search
CPC ... F16L 13/103; F16L 13/116; B29C 66/1162; B29C 66/5221; B29C 66/721; B29C 66/73941; B29C 66/71; B29C 66/7212; B29C 65/483; B29C 65/542; B29C 65/8246
USPC ........ 285/915, 423, 330, 296.1, 21.2, 294.3, 285/290.1
See application file for complete search history.

(56) References Cited

U.S. PATENT DOCUMENTS

| 170,473 A * | 11/1875 | Brown et al. .................. 285/14 |
| 2,313,074 A * | 3/1943 | Jewell ..................... F16L 13/11 |
| | | 285/294.3 |

(Continued)

*Primary Examiner* — Zachary T Dragicevich
(74) *Attorney, Agent, or Firm* — Nath, Goldberg & Meyer; Jerald L. Meyer

(57) ABSTRACT

A system of jointing reinforced thermosetting resin (RTR) pipe, including: a first RTR pipe with a spigot portion, the spigot portion having a first joining surface; a second RTR pipe with a socket portion shaped to receive the spigot portion, the socket portion having a second joining surface; and a cavity between the first joining surface and the second joining surface, the cavity formed when the spigot portion is push-fit into the socket portion; and an injectable/curable material located in the cavity. Additionally, a method of jointing RTR pipe, including the steps of: push-fitting a spigot portion of a first pipe into a socket portion of a second pipe, forming a cavity between the spigot portion and the socket portion; injecting a joining compound into the cavity; and curing the joining compound.

4 Claims, 14 Drawing Sheets

(51) Int. Cl.
*B29C 65/48* (2006.01)
*B29C 65/82* (2006.01)

(56) References Cited

U.S. PATENT DOCUMENTS

| | | | | | |
|---|---|---|---|---|---|
| 3,999,786 | A | * | 12/1976 | Powondra | F16B 3/04 |
| | | | | | 285/296.1 |
| 4,153,656 | A | * | 5/1979 | Bunyan | 264/40.1 |
| 4,226,444 | A | * | 10/1980 | Bunyan | 285/21.1 |
| 4,670,207 | A | * | 6/1987 | Yamada | B29C 65/02 |
| | | | | | 156/294 |
| 5,520,422 | A | * | 5/1996 | Friedrich | F16L 9/12 |
| | | | | | 285/296.1 |
| 5,779,843 | A | * | 7/1998 | Kumagai | B29C 66/5221 |
| | | | | | 285/21.2 |
| 2009/0014121 | A1 | * | 1/2009 | McPherson | 156/296 |

\* cited by examiner

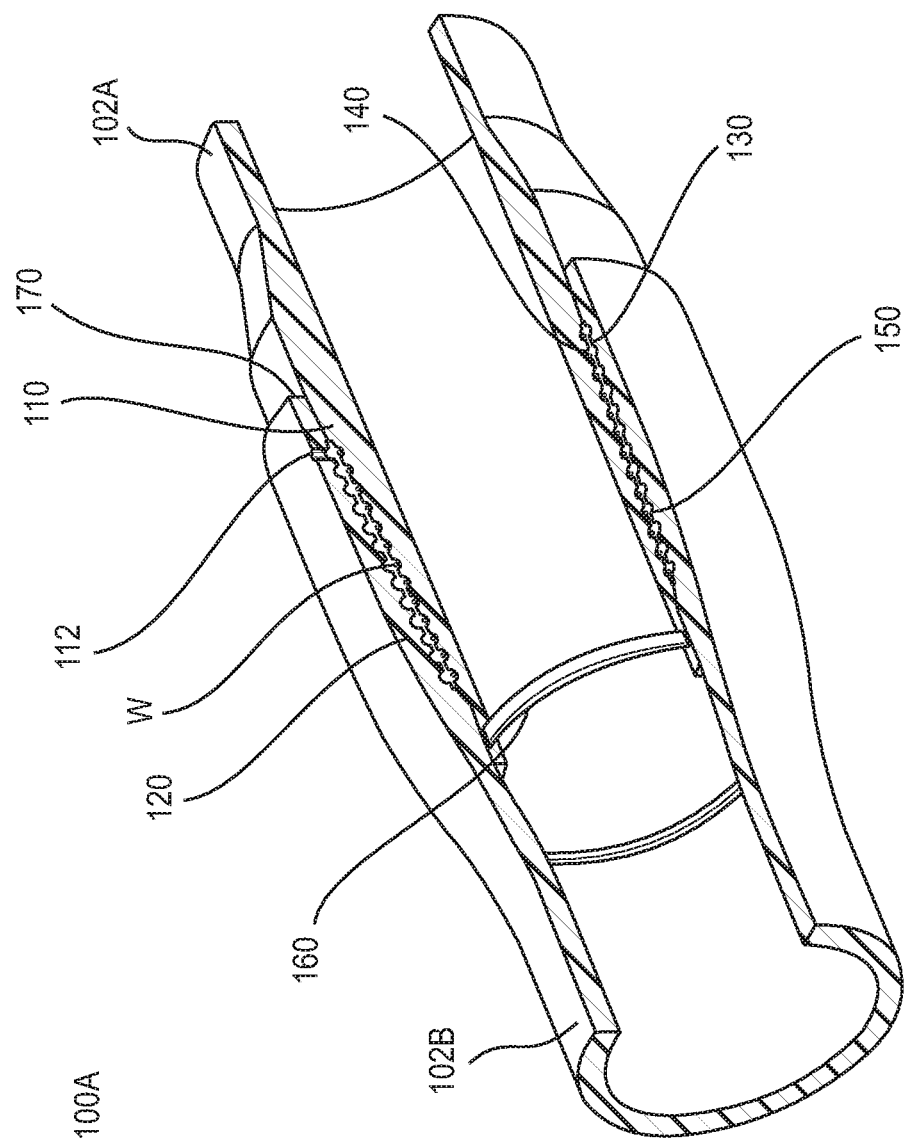

SPIGOT

TESTING

INTERNAL BELL MACHINING

INJECTION: VACUUM / GRAVITY

WINDING IN FPI AD STANDARD PLX EQUIPMENT

ASSEMBLY: PUSH-FIT

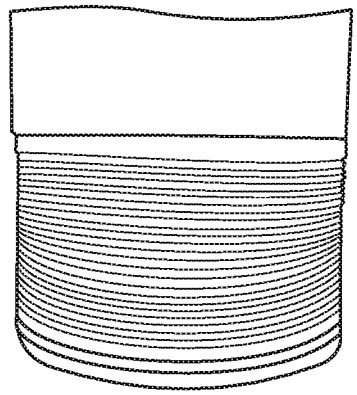
FIG. 11A SPIGOT MACHINING
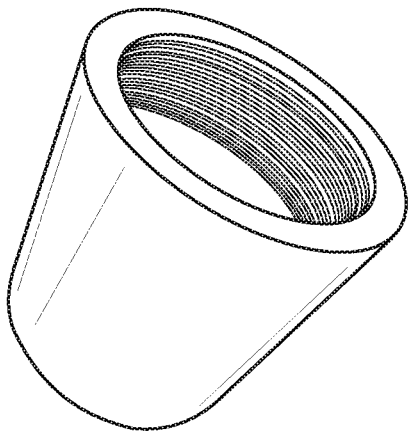
FIG. 11B SPIGOT
FIG. 11C MOLDER COUPLER
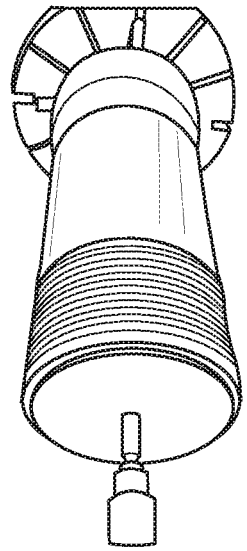
FIG. 11D ASSEMBLY: PUSH-FIT
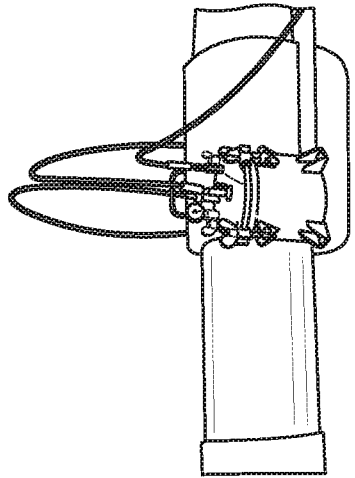
FIG. 11E VACUUM INJECTION
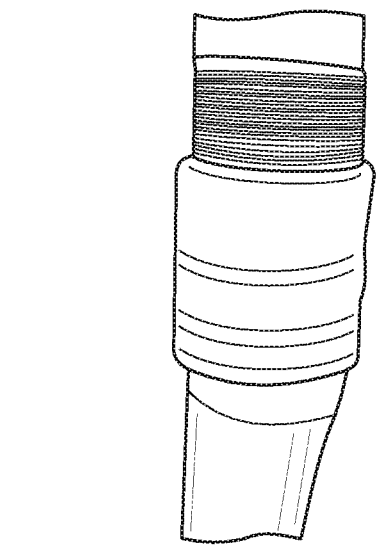
FIG. 11F ASSEMBLED

FIBERGLASS PIPE JOINTING METHODS AND SYSTEMS

CROSS-REFERENCE TO RELATED APPLICATIONS

This is a Non-Provisional Application claiming the benefit under 35 USC 119(e) U.S. Provisional Patent Application No. 61/564,046 filed on Nov. 28, 2011, the content of which is hereby incorporated by reference in its entirety.

BACKGROUND

Technical Field

The present subject matter relates to jointing systems and methods for fiberglass pipe. In a non-limiting particular example, the jointing systems and methods for fiberglass pipe are used in high pressure applications.

Description of Related Art

In recent years composites have become increasingly accepted materials for critical structural applications. An interesting example of this trend can be found in the aerospace industry, in which composite materials comprise more than 50% of materials of the latest commercial aircraft (for example, the Boeing 777 and Airbus 350-900). Related composite material applications in the aerospace industry include wings, fuselage and tail body.

A similar trend can be found in oil fields, for example in the Middle East, where coated steel has been the dominant pipe material over the last decades. Over time, the oil fields in the region have become increasingly depleted, thus requiring water injection to maintain pressure in the reservoirs and keep production to required levels. This water injection increases the water-cut of the produced fluids, resulting in a very corrosive mixture, which can cause extensive internal and external corrosion in steel piping as seen in FIGS. 1A and 1. For this reason, reinforced thermosetting resin (RTR) pipe, which is an extremely corrosion resistant material, has increasingly found acceptance as an alternative pipe material for transportation of produced fluids and injection water.

Besides its corrosion resistance, RTR pipe has many additional advantages, such as its high durability, a high strength-to-weight ratio and a smooth inner surface. As a result of the latter, RTR pipe, or RTRP, offers a much reduced flow resistance when compared to the more traditional materials. Application of RTRP also increases the reliability of the system by preventing leaks, thereby reducing life cycle costs. Due to its inherent light-weight composition and general ease of joining in low pressure applications, the installation costs of RTRP are also much reduced.

Accordingly, successful design, production and qualification of RTR pipe mechanical joints capable of withstanding the high pressures required for these type of applications is desired.

BRIEF SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

An aspect of the present subject matter is a system of jointing reinforced thermosetting resin (RTR) pipe, comprising: a first RTR pipe having a spigot portion, the spigot portion including a first joining surface; a second RTR pipe having a socket portion shaped to receive the spigot portion, the socket portion having a second joining surface; and a cavity between the first joining surface and the second joining surface, the cavity formed when the spigot portion is push-fit into the socket portion; and an injectable/curable material located in the cavity.

Another aspect of the present subject matter is a method of jointing reinforced thermosetting resin (RTR) pipe, comprising the steps of: push-fitting a spigot portion of a first pipe into a socket portion of a second pipe, forming a cavity between the spigot portion and the socket portion; injecting a joining compound into the cavity; and curing the joining compound.

In accordance with another aspect, a method of joining fiberglass pipe is provided, comprising: push-fitting a first fiberglass pipe into a second fiberglass pipe, boring a top hole on a top of the second fiberglass pipe, and injecting a joining compound into the bottom hole, such that any cavities between the first and second pipes are filled by the joining compound.

In accordance with another aspect, a system for high-speed joining of fiberglass pipe is provided, comprising: a first fiberglass pipe, having a spigot portion, a second fiberglass pipe, having a bell portion and a top hole bored at a top position of its bell, and an injectable joining compound, wherein the second fiberglass pipe fits into the first fiberglass pipe and the joining compound is injected into the bottom hole to securely join the first and second fiberglass pipes.

In accordance with another aspect, a method of joining fiberglass pipe is provided, comprising: push-fitting a first fiberglass pipe and a second fiberglass pipe into opposing ends of a coupler fiberglass pipe, boring a top hole on the top of the coupler fiberglass pipe, and injecting a joining compound into the bottom hole, such that any cavities between coupler and the first and second pipes are filled by the joining compound.

In accordance with another aspect, a system for high-speed joining of fiberglass pipe is provided, comprising: a first fiberglass pipe, having a spigot portion, a second fiberglass pipe, having a spigot portion, a coupler, having a molded portion to mate with each of the two spigot portions, and a top hole bored at a top position of its molded portion, and an injectable joining compound, wherein the first and second fiberglass pipes fit into the coupler fiberglass pipe and the joining compound is injected into the bottom hole to securely join the first and second fiberglass pipes with the coupler fiberglass pipe.

BRIEF DESCRIPTION

FIGS. 1A-B show internal and external corrosion of steel piping systems, due to high water-cut.

FIGS. 2A-C show various RTR pipe joints for oil production applications.

FIGS. 3A-D shows some steps in an example manufacturing process of a fiberglass pipe.

FIG. 4A is a cross-sectional view of an injected joint.

FIG. 11A illustrates a machined a spigot.

FIG. 11B illustrates a finished spigot.

FIG. 11C illustrates a molded coupler.

FIG. 11D illustrates a push-fit assembly of a pipe and a spigot.

FIG. 11E illustrates vacuum injection of a pipe.

FIG. 11F illustrates an assembled pipe and injected mechanical joint.

DETAILED DESCRIPTION

Overview

Figure 1A:
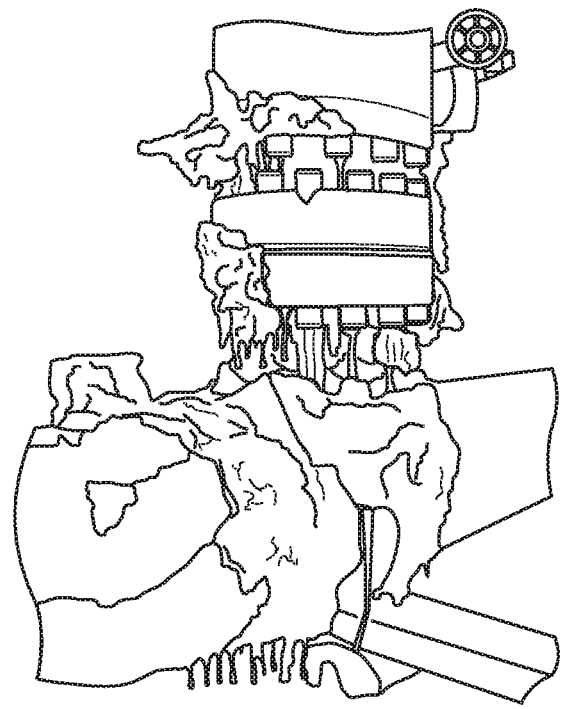
Figure 1B:
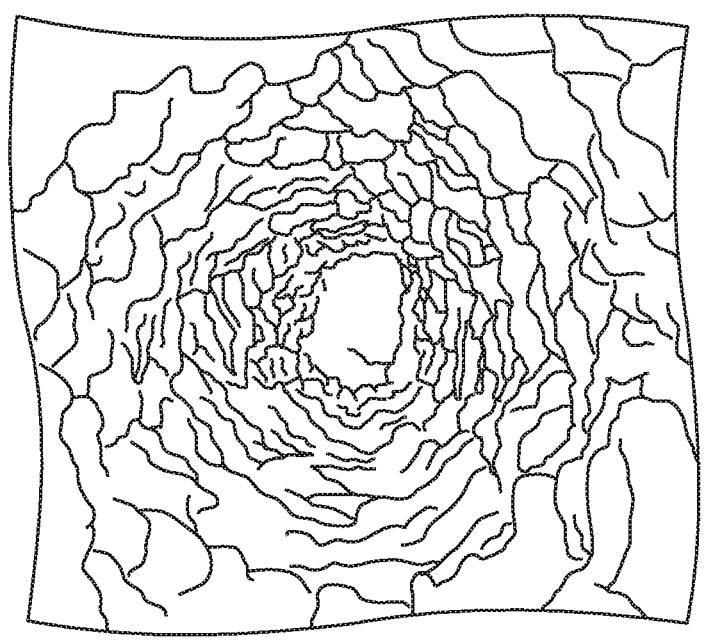

A summary of the competitive attributes of RTRP compared to other, more traditional, materials is presented in Table 1. It is noted that the composition of "fiberglass pipe" is defined by ASTM D 2310 for glass-fiber-reinforced thermosetting resin pipe. Accordingly, the terms "RTRP," "RTR pipe" and "fiberglass pipe" are used herein interchangeably.

TABLE 1

Competitive attributes of reinforced thermoset resin pipe (RTRP)

| Advantages | Description |
| --- | --- |
| Lightweight | lower transportation and installation costs compared to materials such as steel and concrete. |
| Durable | survives harsh conditions with lower replacement needs than steel, ductile iron and concrete. |
| Anti-corrosive | leakage from corrosion is significantly less than other materials meaning a longer life than other more corrosive materials. |
| Efficient carrier | better hydraulic performance than steel, ductile iron and concrete. |
| Versatile material | works in a multitude of applications and end-markets. |

Reinforced Thermosetting Resin (RTR) Pipe

Over the past five decades, RTR pipe technology has evolved to produce a material which now offers superior alternative specification pipe systems to traditionally used pipe materials. RTR pipe products appeared first in the 1950's with the development of downstream petrochemical products. Since the 1970's, the technology has evolved to enable RTR to be used as either the pipe material of choice, or as a feasible alternative for certain applications.

Manufacture

RTRP is typically produced by a filament winding process. This process involves winding glass-fiber filaments under controlled tension over a steel mandrel. The mandrel rotates while a carriage moves horizontally, laying down the reinforcement fibers in the desired pattern. The filaments are coated and impregnated with a synthetic resin as they are wound. Once the mandrel is completely covered to the desired thickness, the mandrel is placed in an oven to cure or set the resin. Once the resin has cured, the mandrel is removed, leaving a hollow final product.

Filament winding is well suited to automation, where the tension and placement of the filaments can be carefully controlled. The orientation of the filaments can also be carefully controlled so that successive layers are plied or oriented differently from the previous layer. The angle at which the fiber is laid down will determine the properties of the final product. For example, a high angle "hoop" will provide crush strength, while a lower angle "closed" or "helical" pattern will provide greater tensile strength. For particular pressure applications, pipe is typically helically wound at a nominal ±55 degree angle for optimum strength to weight ratio. Other products produced using this technique include golf clubs, pipes, oars, bicycle forks, power and transmission poles, pressure vessels to missile casings, aircraft fuselages, lamp posts and yacht masts, among many others.

In case of filament winding of fittings the production process is varied slightly. Filaments are wound under tension over a steel mold that has the inside dimensions of the fitting to be produced. The mold can either be rotated or kept in a fixed position; in case of the latter a rotating station that can wind the reinforcement around the mold is needed. Once the mold mandrel is completely covered to the desired thickness, the mandrel is placed in an oven to cure or set the resin. Once the resin has cured, the mold mandrel is removed, leaving a hollow final product.

Applications

RTR pipe has the ability to service a wide array of applications within a large number of end-markets. The member States of the Gulf Cooperation Council (GCC) is the fastest growing RTR pipe market in the world. This market growth has been supported by not only the strong growth in end-markets where RTRP already enjoys a sizeable market presence, but also a wide acceptance in the region for this material, instead of other more traditional pipe materials. Selected end-markets and typical applications for RTRP are provided in Table 2. These include, among others, oil & gas production, water transmission & distribution, infrastructure & municipal, industrial & petrochemical, desalination & power, and marine & offshore markets.

TABLE 2

End-markets and applications for RTR pipe

| End-Market | Typical Applications |
| --- | --- |
| Oil & gas production | Water injection, oil production lines, gathering lines, trunk lines, etc |
| Water Distribution | Drinking water transmission mains & distribution networks |
| Infrastructure & Municipal | Sewerage, drainage, irrigation |
| Industrial & Petrochemical | Cooling water, fire water, chemical seawater intake/outfall |
| Desalination & Power | Cooling water, fire water, drinking water, seawater intake/outfall |
| Marine & Offshore | Ballast systems, cooling water, fire water, seawater intake/outfall |

Applicable Product Standards

Over the years a number of international and end-user specific specifications for the use of fiberglass pipe have been developed. The most relevant international standards for application of RTRP in oil production applications are provided in Table 3.

TABLE 3

Relevant International Standards

| Specification | Title |
|---|---|
| API 15 HR | Specification for high pressure fiberglass line pipe |
| API 15 LR | Specification for low pressure fiberglass line pipe and fittings |
| ISO 14692 | Petroleum and natural gas industries—Glass-reinforced plastics (GRP) piping |
| AWWA M45 | Fiberglass pipe design |

In addition to these international standards, there are a large number of end-user specific standards for application of RTRP in oil production. Large national and international oil companies (e.g., Aramco, ADCO, Shell, BP, etc.) typically also have their own standards, largely based on the established principles defined in the international standards.

RTR Pipe for Oil Production Lines

The inventors have been at the forefront of the promotion and implementation of these materials for oil production applications. Since the early 1990s the inventors have generated a significant amount of experience in the GCC region with medium pressure (up to 50 bar) RTR pipe systems. Over the last decade alone, the inventors have installed in excess of 500 km of DN200-DN500 epoxy reinforced medium pressure pipe for oil field applications in the Middle Eastern region.

RTR Pipe Design

RTR pipe components are generally rated by internal pressure. Standards typically describe a pressure rating methodology based on short-term and long-term hydrostatic qualification tests. The pressure rating further involves assumptions about the design life, operating temperature, safety factors and pipeline or piping system design factors. The nominal pressure rating that manufacturers assign to their products can differ from manufacturer to manufacturer, as a result of different assumptions made.

To overcome this, a long-term strength has been defined that excludes design and safety factors. A generally accepted procedure to determine the long-term strength of RTR is described in ASTM D 2992. This standard evaluates the strength-regression data obtained over a 10,000 hr (~14 month) testing period. It establishes a procedure for obtaining a long-term (typically for a 20 year design life-time) hydrostatic pressure (LTHP), a long-term hydrostatic stress (LTHS), as well as their respective confidence limits, $LCL_{pressure}$ and $LCL_{stress}$. It is noted that piping components have to be tested at design temperature or higher. In order to realize a sufficient distribution of failure data, the total time required to complete the long-term testing often exceeds two years. For practicality, and to limit involved time and costs, these tests are generally run on small bore pipe only (typically DN50 to DN250).

Using the derived $LCL_{stress}$ value for a 20 year design life, the pipe-wall thickness required can be derived as shown in Eq. 1.

$$t_R = \frac{ID}{\left(\frac{20 \cdot LCL_{stress}}{S_f \cdot PN} - 1\right)} \quad \text{(Eq. 1)}$$

where:
- $t_R$=reinforced wall-thickness of the RTR pipe [mm]
- ID=internal diameter of the RTR pipe [mm]
- $LCL_{stress}$=lower confidence limit of the long term hydrostatic stress [MPa]
- PN=design pressure of the RTR pipe [bar]
- $S_f$=safety factor [no units]

The safety factor ($S_f$) is typically 1.5, but can be increased if needed in case of cyclic pressure variations, bending of the pipe in excess of the minimum bending radius as recommended by the manufacturer, high thermal loads, additional safety required at road crossings, type of installation (e.g., above-ground versus under-ground), etc. Recommendations for determining reasonable estimates for $S_f$ are available in the relevant international standards, such as API 15 HR and ISO 14692.

In addition to the reinforced wall-thickness, RTR pipe typically also has a resin-rich liner of around 0.5 mm, and a resin-rich topcoat of around 0.3 mm. The liner acts as an additional corrosion barrier to the RTR pipe, and the top coat acts as an protective outer layer which gives resistance to UV degradation and an allowance for surface scratches which may occur during handling of the pipe. The total pipe wall-thickness is then given by Eq. 2.

$$t_T = t_R + t_L + t_c \quad \text{(Eq. 2)}$$

where:
- $t_T$=total wall-thickness of the RTR pipe [mm]
- $t_R$=reinforced wall-thickness of the RTR pipe [mm]
- $t_L$=liner thickness of the RTR pipe [mm]
- $t_C$=top-coat thickness of the RTR pipe [mm]

Joint Selection

Figure 2A:
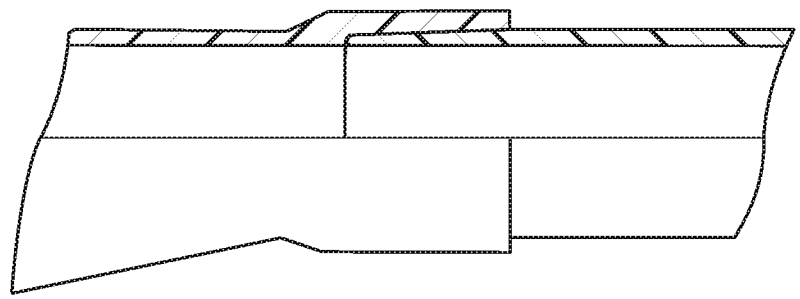
Figure 2B:
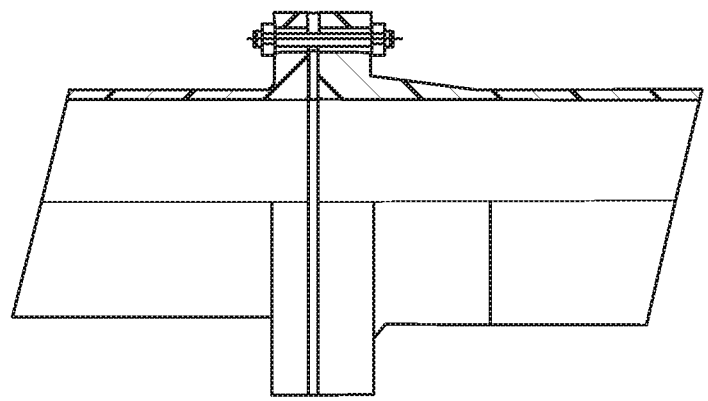

Since the early 1990s the inventors have generated excellent experience in the GCC oil field with the use of adhesive bonded joints, see FIG. 2A. These types of joints are an excellent choice for low-to-medium pressures (typically up to 50 bar or 725 psi). As seen in Table 4, well over 600 km of these types of joints for oil production in the region over the last 10-15 years have been installed. As needed, connections to steel components are made using flanged connections, shown in FIG. 2B.

TABLE 4

Reference list for medium pressure RTRP projects in GCC region

| Location | Year | Piping System Utility | Diameter (mm) | Design Pressure (Barg) | Design Temp (° C.) | Quantity (mtrs) |
|---|---|---|---|---|---|---|
| Oman | 2000 | Crude Oil | 350 | 35 | 90° | 32,000 |
| Oman | 2001 | Crude Oil | 250 | 50 | 65° | 29,000 |
| Oman | 2002 | Crude Oil Transmission | 350 | 40 | 65° | 23,000 |
| Oman | 2002 | Water Transmission | 80-300 | 20 & 15 | 65° | 1,000 |
| Oman | 2003 | Crude Oil Transmission | 350 & 400 | 32 | 65° | 35,000 |
| Kuwait | 2004 | Seawater, Fire Water, Cooling | 25-900 | 10-27.3 | 65°-93° | 180,000 |

TABLE 4-continued

Reference list for medium pressure RTRP projects in GCC region

| Location | Year | Piping System Utility | Diameter (mm) | Design Pressure (Barg) | Design Temp (° C.) | Quantity (mtrs) |
|---|---|---|---|---|---|---|
| Oman | 2005 | Crude Oil Transmission | 400 | 25 | 65° | 29,000 |
| Oman | 2005 | Water Transmission | 100, 150 & 250 | 35.3 | 82° | 23,000 |
| Oman | 2006 | Crude Oil Transmission | 350 | 50 | 67° | 45,000 |
| Oman | 2007 | Crude Oil Transmission | 400 | 35 | 65° | 28,000 |
| Oman | 2007 | Crude Oil Transmission | 400 | 35 | 65° | 5,000 |
| Oman | 2007 | Crude Oil Transmission | 500 | 30 | 65° | 28,000 |
| Oman | 2007 | Crude Oil Transmission | 400 | 35 | 65° | 28,000 |
| Oman | 2007 | Crude Oil Transmission | 400 | 35 | 65° | 5,000 |
| Oman | 2008 | City Water | 50-250 | 16 | 65° | 4,500 |
| Oman | 2009 | Crude Oil Transmission | 200 | 50 | 65° | 36,000 |
| Oman | 2009 | Crude Oil Transmission | 400-450 | 35 | 65° | 8,500 |
| Oman | 2009 | Crude Oil Transmission | 50-250 | 10 | 90° | 4,200 |
| Oman | 2009 | Crude Oil Transmission | 450 | 40 | 65° | 7,600 |
| Oman | 2010 | Water | 450 | 47.5 | 65° | 5,400 |
| Oman | 2010 | Water Injection Lines | 25-750 | 8-25 | 60°-90° | 3,500 |
| Oman | 2010 | Water | 450 | 47.5 | 65° | 34,000 |
| Oman | 2011 | Crude Oil Transmission | 25-400 | 15 | 80° | 3,500 |
| Oman | 2011 | Water | 200-250 | 47.5 | 65° | 4,500 |

The inventors have also started implementation of high pressure RTR pipe (up to 2,000 psi) for oil production applications in the region. A number of users have embraced this new technology and several pilot projects have already been successfully installed, as seen in Table 5.

TABLE 5

Reference list for high pressure RTRP projects in GCC region

| Location | Year | Piping System Utility | Diameter (mm) | Design Pressure (Barg) | Design Temp (° C.) | Quantity (mtrs) |
|---|---|---|---|---|---|---|
| Kuwait | 2006 | Crude oil flow line | 6 | 70 | 85° C. | 1,000 |
| KSA | 2008 | Water injection line | 4 | 100 | 65° C. | 500 |
| KSA | 2009 | Water injection line | 8 | 140 | 70° C. | 500 |
| KSA | 2010 | Crude oil flow line | 6 | 100 | 95° C. | 500 |

TABLE 5-continued

Reference list for high pressure RTRP projects in GCC region

| Location | Year | Piping System Utility | Diameter (mm) | Design Pressure (Barg) | Design Temp (° C.) | Quantity (mtrs) |
|---|---|---|---|---|---|---|
| Syria | 2010 | Water injection line | 6 | 100 | 70° C. | 20,000 |
| KSA | 2011 | Crude oil flow line | 6 | 100 | 95° C. | 1,000 |
| KSA | 2011 | Crude oil flow line | 8 | 100 | 95° C. | 1,000 |
| UAE | 2011 | Water injection line | 4 | 35 | 65° C. | 500 |
| KSA | 2011 | Crude oil flow line | 6 | 100 | 95° C. | 1,000 |
| UAE | 2011 | Water injection line | 6 | 50 | 85° C. | 3,500 |
| UAE | 2011 | Water injection line | 8 | 93 | 85° C. | 14,000 |

Figure 2C:
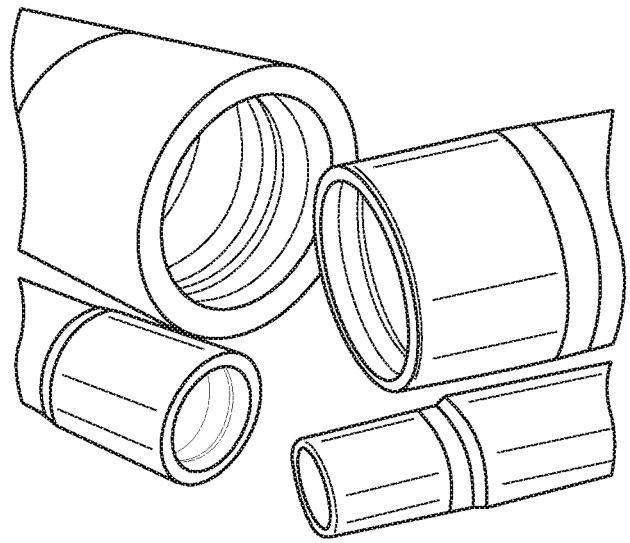

The preferred jointing system for these higher design pressures are API 5B threaded joints, seen in FIG. 2C, which have a long proven track record in the oil field, both for line pipe—and down-hole applications. More information can be found in API Specification 5B—Specification for Threading, Gauging and Thread Inspection of Casing, Tubing, and Line Pipe Threads, 15th Edition, 2008, which is hereby incorporated by reference.

However, as evidenced by the above discussion and facts, there are gaps and limitations in the ability of existing RTR pipe to be used in oil field applications. These limitations may be most obvious when captured in terms of pressure and diameter. The limitations are approximately described in Table 6, with respect to "pressure nominal" (PN) or nominal pressure class, and "diameter nominal" (DN) or nominal pipe diameter.

TABLE 6

Typical limitations of RTR Pipe joints

| RTR Pipe Joint Type | Typical Limitations |
|---|---|
| Taper-Taper Adhesive | PN ≤ 750 psi for 4" ≤ DN ≤ 20" |
| | PN ≤ 500 psi for 24" ≤ DN ≤ 32" |
| | PN ≤ 300 psi for 36" ≤ DN ≤ 40" |
| API Threaded Joints | PN ≤ 2,000 psi for 4" ≤ DN ≤ 6" |
| | PN ≤ 1,500 psi for 8" ≤ DN ≤ 10" |
| | PN ≤ 1,250 psi for 12" ≤ DN ≤ 14" |

It must be noted that these limitations in design pressure are mainly due to limitations in joint performance. In particular, the pipe body can typically be produced and qualified at much higher pressures than the joints.

Clearly, the above discussion indicates joint performance at high pressures as the biggest limiting factors of the applicability of RTRP in oil-field applications. In contrast, steel pipelines can be designed and are applied to much higher pressures, as seen in Table 7.

TABLE 7

Typical limitations of Steel Pipe joints

| Steel Pipe Typical Oil-Field Applications | Typical Limitations |
| --- | --- |
| Welded Joints | PN ≤ 3,500 psi for 4" ≤ DN ≤ 12"<br>PN ≤ 2,500 psi for 14" ≤ DN ≤ 20"<br>PN ≤ 1,500 psi for 24" ≤ DN ≤ 40" |

As the material properties of RTR pipe are in many ways preferred over steel pipes, it is clear that the joint is the issue, compared to jointing of steel pipes. Traditional jointing of steel pipes includes welding or threaded pipe and fittings. Welding of steel pipe is relatively simple, but also time consuming and expensive. For the long-term performance of a steel pipeline, the quality of the weld is critical, and the welding skill and experience of the welder is paramount. Typical welding speeds for steel pipe welds are around 0.25 to 0.5 meters per hour; therefore, it would take at least two to four hours to weld a DN300 steel pipe. In oil and gas type applications the weld is commonly inspected using X-ray or ultrasound. This ultrasonic or X-ray inspection further increases the already significant expense of achieving such joints, and also adds to the time needed to achieve jointing of steel pipe.

Additionally, it is often preferred to apply a protective coating to the interior of the steel pipe, prior to welding, to reduce corrosion. The coating must be completely cured prior to any welding and of course, inspection steps add latency to the jointing process. Furthermore, the welded area typically remains sensitive to corrosion, particularly on the inside of the pipeline which cannot be coated after the welding is completed. Finally, any errors in the weld may require that the entire process be restarted.

Threaded pipe and fittings, particularly for galvanized water piping, will always be used for repairs or on specialized fittings (e.g., flange fittings) but it is not a preferred installation. There are many drawbacks to using threaded fittings, one of which is the fact that the galvanized pipe and fittings can be difficult to repair. As the galvanized pipe and fittings start to break down, sediment and rust build up inside the piping, shrinking the inside diameter of the piping. If a repair needs to be done, many times the person repairing the pipe will find that there is more damaged piping than originally expected. Furthermore, to make a repair on threaded pipe and fittings requires equipment to cut and thread the pipe; if the equipment is not available, the repair person has to have the skill set to be able to make the correct measurements, which are then relayed to a source with the capability to cut and thread the piping. Any inaccuracy in the measurements could affect operations, and lead to lost time, money and poor customer relations.

Furthermore, in an aging steel pipe system, it is not unusual for threaded fittings to be fused together and extremely difficult to remove. This usually involves cutting the piping in the general area of repair and finding a fitting that the piping can be backed out of, or cutting the piping close to the fitting and capping the remaining pipe.

Another jointing system is a mechanical joint, or any method joining piping or fittings by way of a coupling that uses compression of a rubber gasket to ensure a water tight seal. Two examples of mechanical joints are flanged pipe and fittings, and grooved pipe with couplings or fittings that have a rubber gasket; the rubber gasket sits inside the groove and is compressed, filling the groove and sealing the joint.

In theory, the repairs on mechanical joint applications are easier to perform. These are high pressure fittings so their tolerances are high; and one can relatively easily install very large diameter pipe and fittings. However, it takes a fairly high skill level to prepare and install this pipe and the accompanying fittings. For example, it is easy to install the mechanical fittings for grooved pipe, but the measuring and grooving of the pipe takes some know how, while flanged pipe, spool pieces and flanged fittings require a very high skill level to perform new installations or repair. Furthermore, the fittings are heavy, bulky, and expensive, and repairs are labor intensive.

Thus, it can be concluded that for RTR pipe to compete more widely with steel, the pressure rating of the fiberglass pipe systems need to be increased. As the joint performance is a limiting factor in advancing the pressure rating, development within the RTR pipe manufacturers is generally focusing on making available jointing systems that can cope with these high pressures.

To date, although non-steel or plastic pipe can be used with mechanical fittings, the skill level required to install it is high and a good jointing system has not yet been developed. RTR pipe jointing systems that can cope with high pressures would provide a 'best of both worlds' scenario of long-term performance at high-pressures using an accepted and preferred material.

Example 1

The instant subject matter provides a mechanical-injected joint, for fiberglass pipes, that allows for a resulting pipe with greater PN, DN, and operating temperature parameters. Two pipes are installed together, such that the taper of one pipe inner diameter allows the second pipe to fit therein, while leaving a space or cavity there between. An injection port and channel are made in the outer pipe such that a joining material or compound can be injected into the injection port and channel to fill the space or cavity, creating a secure mechanical joint between the two pipes.

Example 2

Figure 3A:
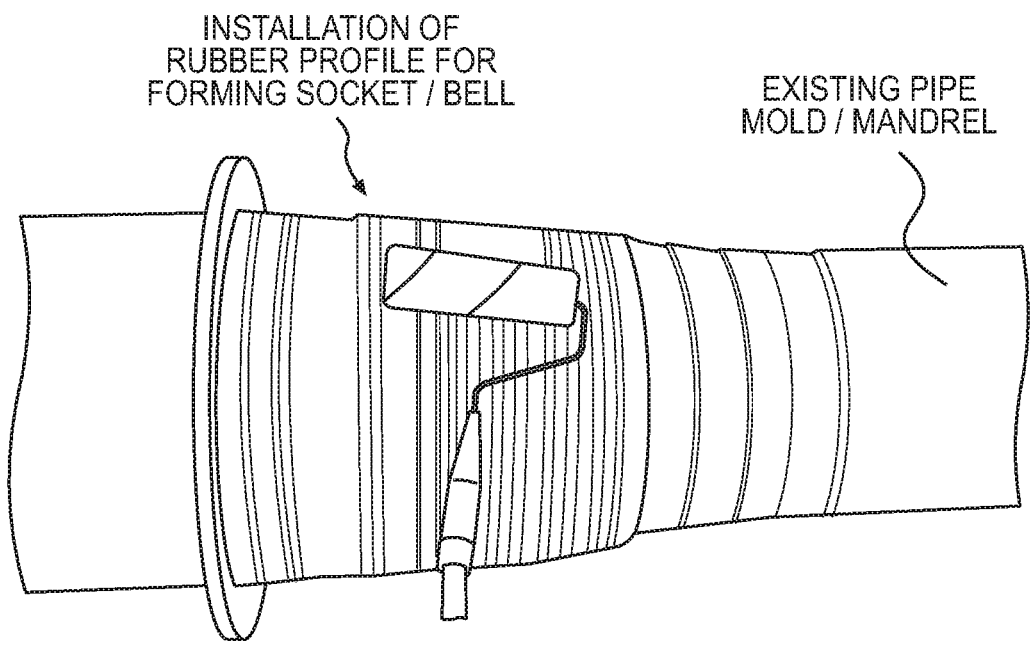
Figure 3B:
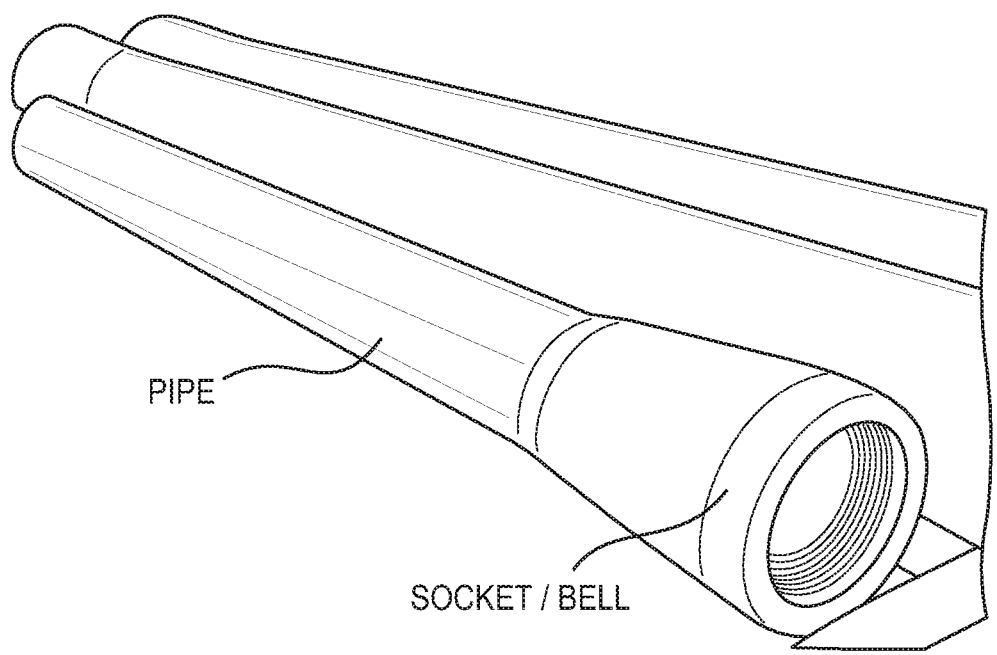
Figure 3C:
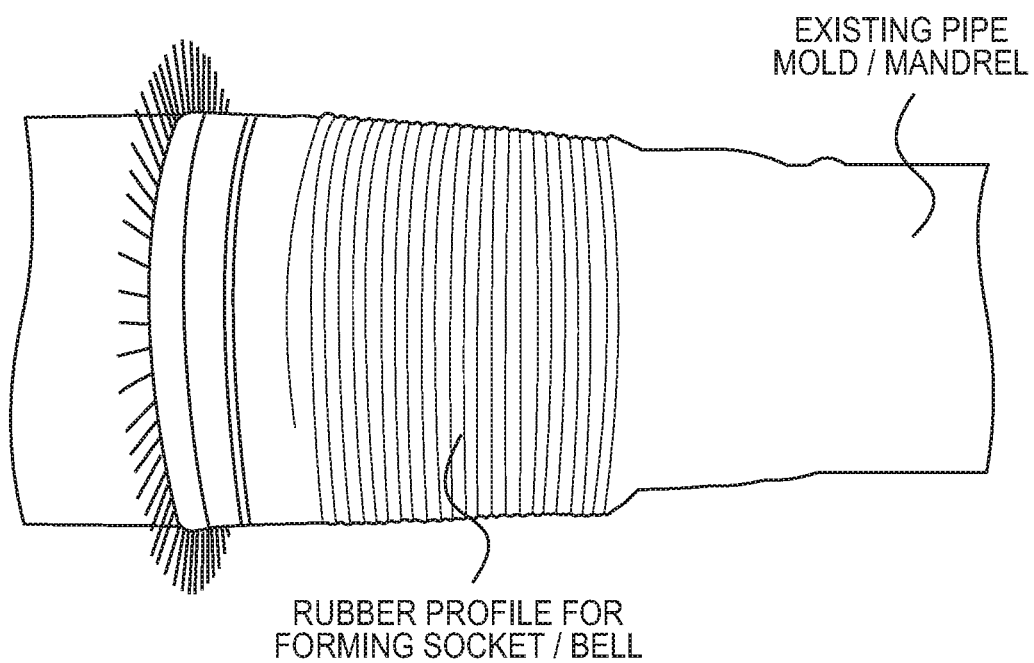
Figure 3D:
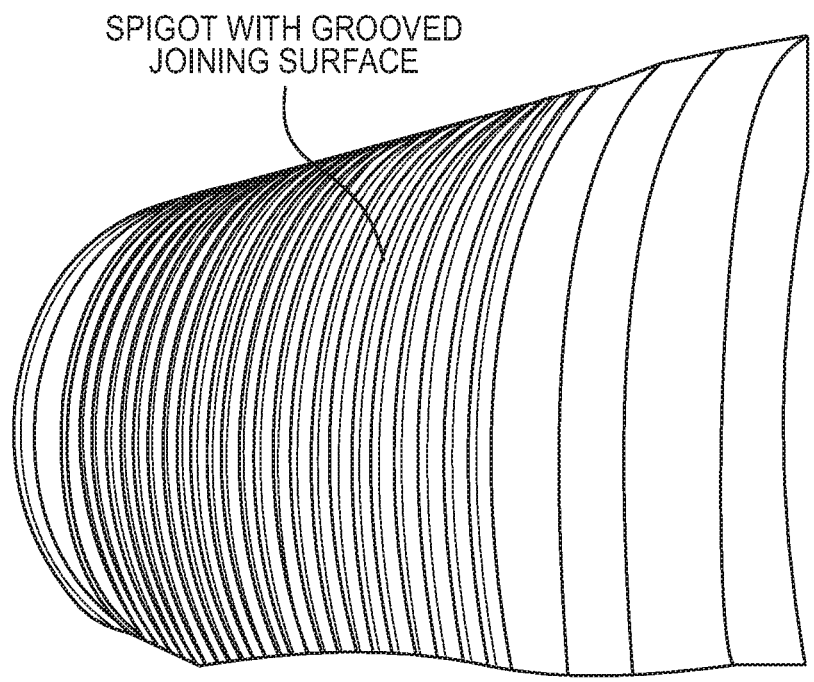

FIGS. 3A-D show steps in an example manufacturing process of fiberglass pipe suitable for jointing by the disclosed system and method. First, with respect to a female (socket) pipe end 10, a winding is made on existing equipment, as shown in FIG. 3A. A rubber profile 1 is used on the existing pipe mandrel 2 to shape the inside of a bell or a socket, such that after winding, the pipe has an integral bell or socket. An non-limiting example 20 of a fiberglass pipe 3 having a bell or socket 4 is shown in FIG. 3B. FIG. 3C shows another view 30 of the pipe mandrel 5 with the rubber profile 6 used for forming the bell or socket with internal grooves. Alternatively, the grooves can be machined into the shape of a bell after the pipe has been de-molded. A corresponding (male) spigot 40 is machined on a lathe to form grooves on the joining surface 7, as shown in FIG. 3D. Thus, the manufacturing process for the joints may be done using existing production equipment. Accordingly, no additional large investments, beyond those already existing in a typical fiberglass pipe facility, are needed to produce this type of pipe joint for fiberglass pipes.

Example 3

Figure 4B:
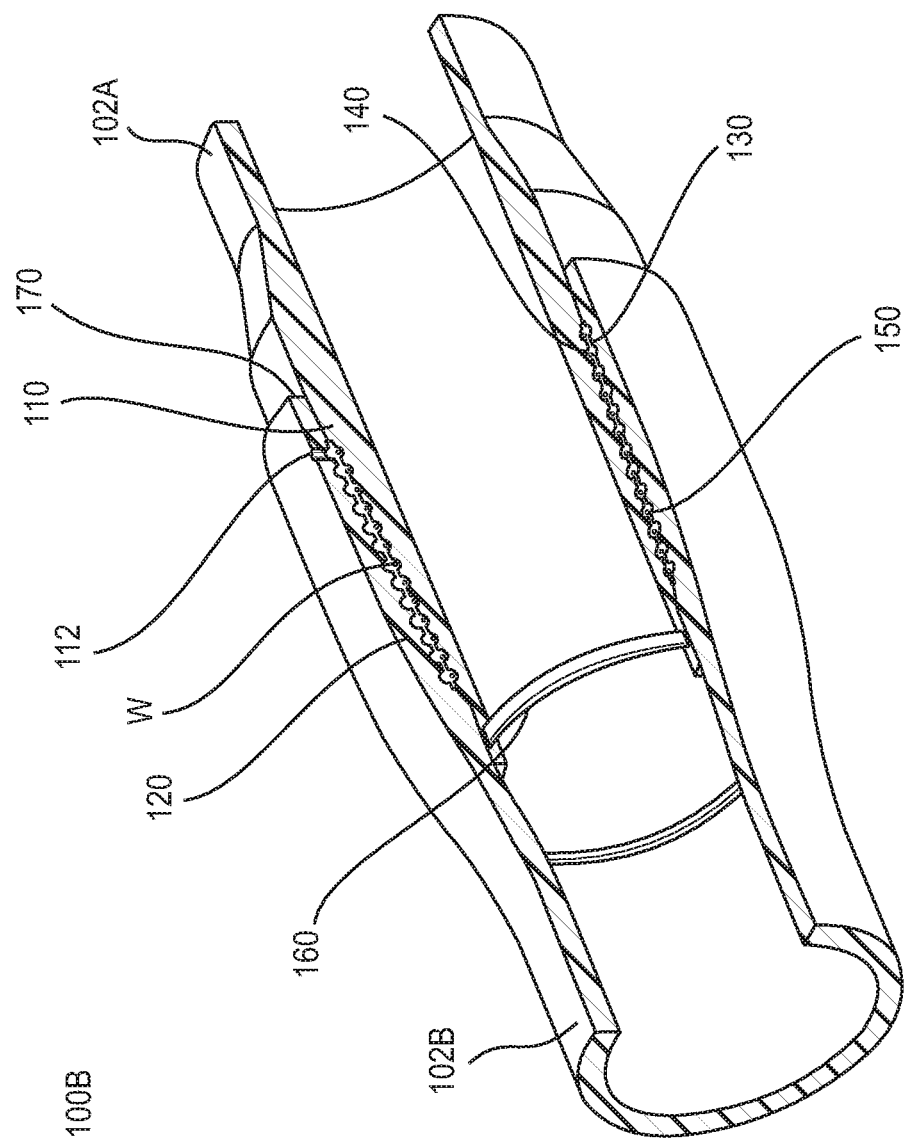
FIG. 4B is a cross-sectional view of an injected joint showing a first sealing element.
Figure 4C:
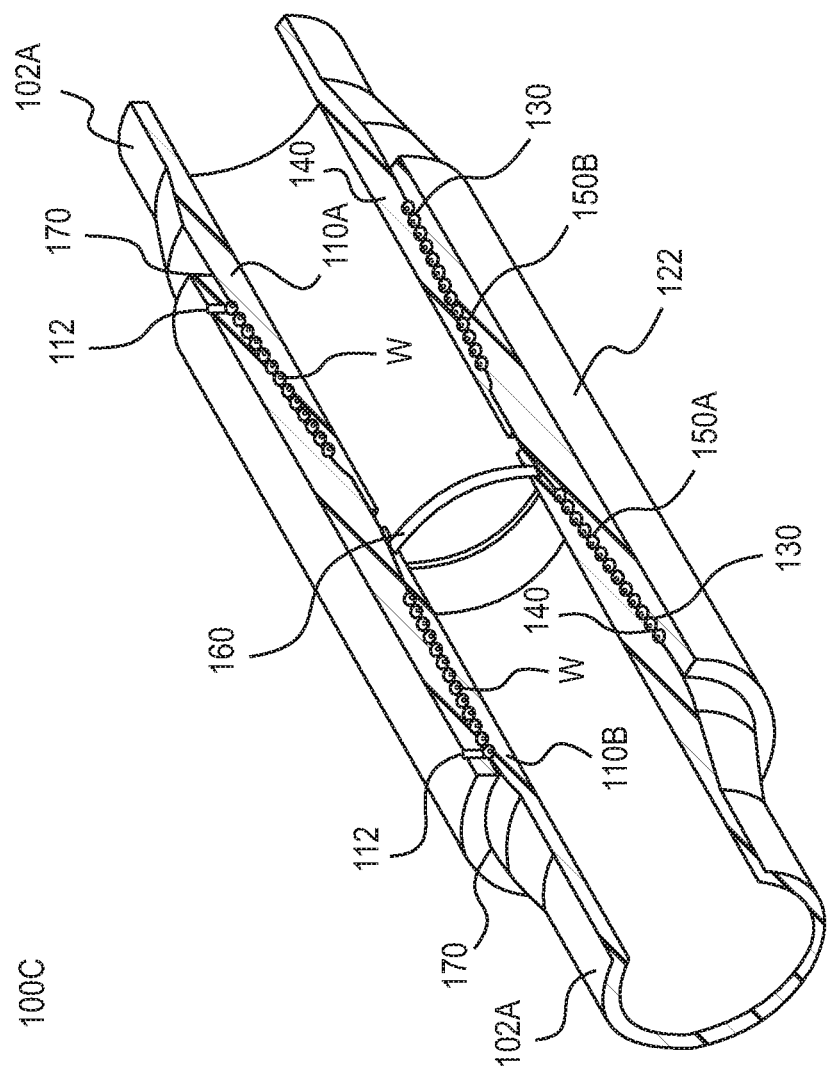
FIG. 4C is a cross-sectional view of an injected joint showing a first sealing element and a joining compound in a first cavity and a second cavity.

A cross-sectional diagram of an injected joint 100A-100C is shown in FIGS. 4A-4C. The joint includes a male (spigot)

110 pipe end 102A and a female (bell or socket) 120 pipe end 102B. The bell portion 120 has an internal joining surface 130 that includes grooves and the spigot portion 110 has an external joining surface 140 that includes grooves. The joint 100A is assembled by pushing the spigot 110 into the socket 120, which is also called a "push-fit". When the joint is assembled, the joining surfaces 140, 130, respectively, of the spigot portion 110 and the bell portion 120 form a cavity in which a joining compound 150 is injected and allowed to cure to form the injected mechanical joint. Regarding the joining compound, the joints 100A-100C are assembled with an injection outlet 112 which provides a passage for the injected material to flow into an outlet hose. By applying a current through a resistance wire W, the joining compound can be cured.

The push-fit is a particular aspect of this design, when compared to threaded pipe joints such as API 5B threaded joints which require large torques for assembly. While the torques required for API 5B threaded joints can be generated by hand for smaller diameters, for diameters in excess of 8" heavy hydraulic equipment is required. This equipment can be difficult to handle in a pipe trench, and thus the threaded pipe joint design is not always appropriate or feasible. In contrast, this push-fit design does not require the pipe to rotate during assembly, nor does it require the use of heavy machinery or equipment, for example power tongs, to assemble the fiberglass pipe joint. Accordingly, at least this push-fit step achieves a savings in cost and time.

The sealing element 160 of the joint can include a rubber sealing ring, or a structural adhesive. The rubber can be made from a wide variety of compounds, including for example, NBR, EPDM, Viton, silicone, etc. The compound selection is typically dependent on the transported medium and the application temperature. It is also contemplated within the scope of the present subject matter that no o-ring is used in jointing fiberglass pipe and that the joining compound 150 forms the seal 160.

If an adhesive sealant is used, the material is applied to the applicable area in the socket 120 and on the spigot 110 prior to joint assembly. During assembly of the joint 100, the mating surfaces will compress, spread and compact the adhesive to form a leak-tight seal 160. The adhesive can include any or a combination of many materials, including without limitation epoxy, vinylester, polyester, polyurethane, methyl acrylate, or silicone-based adhesives. Other types of adhesives may also be used as long as they are qualified by testing. Also contemplated within the scope of the present subject matter is that a combination of an o-ring and adhesive forms the leak-tight seal 160.

As shown in FIG. 4B and FIG. 4C, non-limiting exemplary embodiments of the joints 100B and 100C include a first sealing element 160 and, in some embodiments, may also include a second sealing element or o-ring. Referring to FIG. 4C, there is shown a system of jointing RTR pipe, comprising a coupler 122, a first spigot 102A and a second spigot 102A. The coupler 122 has a first socket portion at a first end and a second socket portion at a second end for receiving each spigot. The coupler 122 is joined to a second spigot portion 110A of the second pipe 102A and is capable of joining a corresponding first spigot portion 110B of the first pipe 102A. Still referring to FIG. 4C, a joining compound is injected into both a first cavity 150B formed between the first spigot 110B and the coupler 122 and a second cavity 150A formed between the second spigot 110A and the coupler 122.

Joint straps or come-along-jacks are typically used to pull the joint together and keep it in position (not shown). If adhesive is used as a sealant, it will need a certain amount of time to cure; the actual period of time depends on the type of sealant used. While the adhesive is curing, the area where the spigot protrudes from the socket, marked as Pressure Seal 170 in FIGS. 4A-4C, also needs to be sealed to create a vacuum-tight chamber. The sealant used for the Pressure Seal 170 can be the same as the adhesive used for the front of the spigot 110, or an alternative sealant material or any other type of seal or gasket (e.g. rubber o-ring) capable of maintaining the pressure and/or vacuum during the injection process.

Once the sealant and adhesive materials have set, the chamber is pressurized with 0.8 to 1 bar air pressure to check for any leaks in the sealing. If pressure cannot be maintained, then this is an indication that there is a leak. In this case the pressure seal area 170 is checked and re-sealed. If this does not solve the problem, the seal at the front of the spigot 110, as shown in FIGS. 4A and 4B, and in front of the spigots 110A and 110B, as shown in FIG. 4C, is likely not air-tight and the joint needs to be taken apart again, and the process started over.

Once the pressure seal 170 holds, the joint is ready for injection 180. The injected joining compound 150 may comprise a mixture of epoxy resin, hardener and filler. For non-limiting example, bisphenol-A (BPA) epoxy resin, IPD hardener, and milled glass filler may be used. One possible mixture composition comprises 100 parts (by weight) of bisphenol-A (BPA) epoxy resin, 24 parts IPD hardener (Evonik Degussa VESTAMIN® IPD Epoxy Curing Agent may be used, among others) and 31 parts of milled glass filler. Although this mixture has been found to give the required strength needed, other mixtures may also yield the required strength. The mixture is produced by gradually mixing the milled glass into the bisphenol-A epoxy resin until the components are completely mixed. Finally, the IPD hardener is added into the mixture.

Figure 5A:
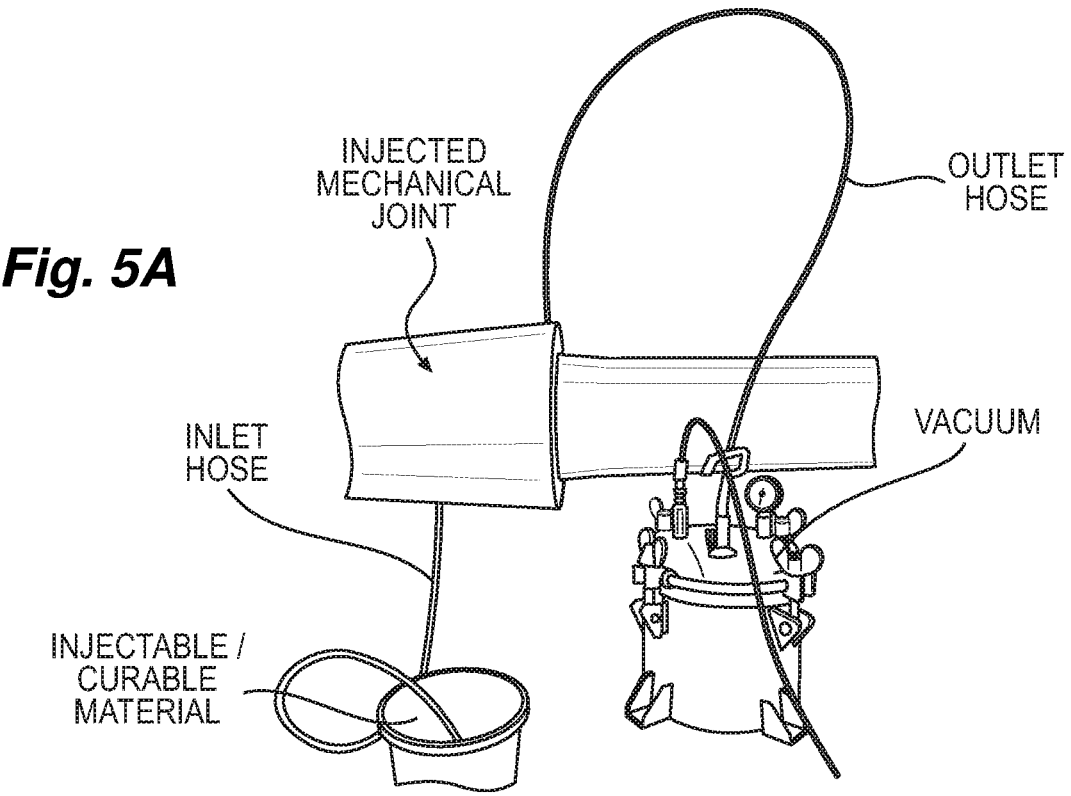
FIG. 5A illustrates a non-limiting injection process system to achieve the injected joint of FIGS. 4A-4C.
Figure 5B:
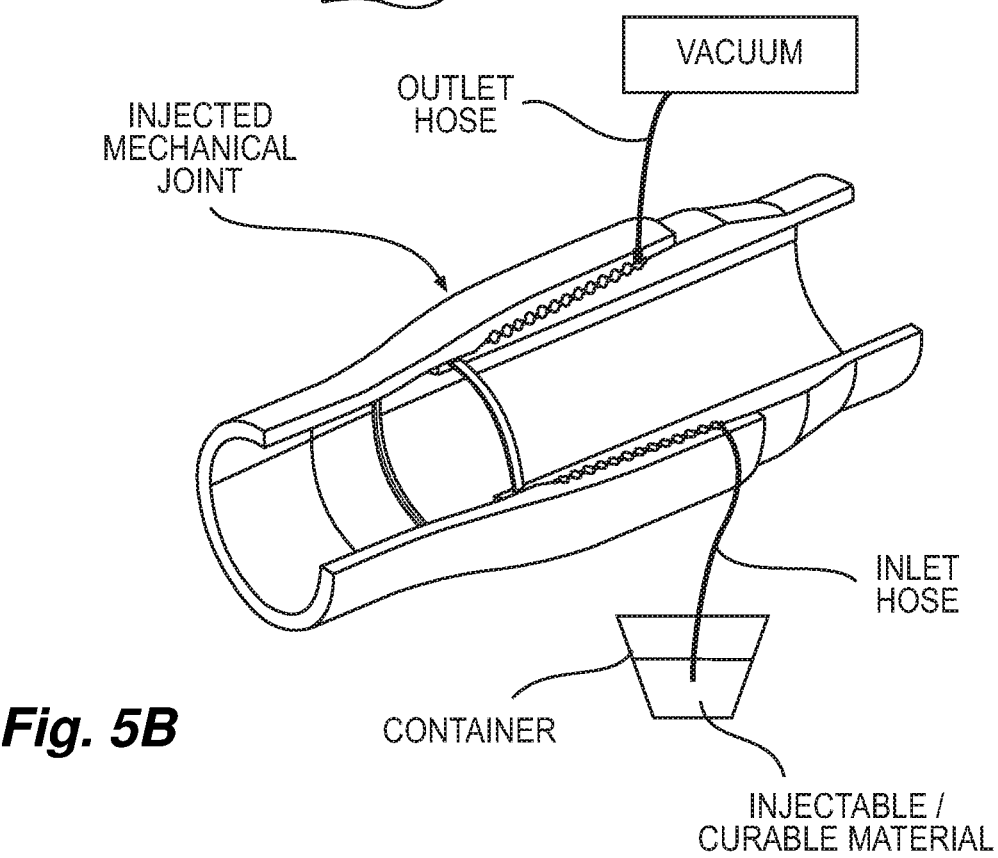
FIG. 5B is a cross-sectional view of an injected joint of the injection process illustrated in FIG. 5A.

The mixture is pushed into the joint by creating a pressure differential in the annulus or cavity of the injection joint, as shown in FIG. 5A and FIG. 5B. The pressure differential moves the resin 260 from its container 210, into the bottom of the injected joint. Gravity ensures that the mixture fills the lower halve of the joint first and that the mixture then gradually rises to the top of the joint 220, towards the outlet hose 230. Vacuum assistance 240, which may be optionally used, also ensures that there is no air entrapment in the annulus and ensures that the annulus is completely filled with the injection mixture. At the point that the mixture flows into the outlet hose 230, the joint 220 is filled, and the inlet hose 250 is clamped off to prevent the mixture from flowing out of the joint 220. Then the outlet hose 230 is cut or removed from the pressure differential chamber and the injected resin mixture is allowed to cure. In one embodiment, the curing process can be accelerated by applying heat through a heating blanket wrapped around the joint. Another way of curing the injected resin mixture is by applying a current through a resistance wire W applied on one of the mating surfaces in the joint, as shown in FIGS. 4B, 4C and 5B. The current will heat the wire and the surrounding material, thereby curing the injection mixture. Typically, the joint is fully cured and has its mechanical strength two to three hours after injection.

A benefit of the push-fit is that several joints can be assembled in one "go" or "round" as they are kept in place by come-along jacks and straps. Once assembled, the injection process can be done joint-by-joint after which the curing cycle can start. In this manner, relatively high installation speeds are achieved, particularly when compared to steel pipe joints which need to be welded. Certainly, the installation time is less than that needed for comparably dimensioned welded steel pipe joints, and is often much faster. Additionally, for the injected joint, there is no need to wait until the injection joint is fully cured before installing the next pipe. Thus, the described methods and systems can be achieved quickly.

Example 4

Figure 6:
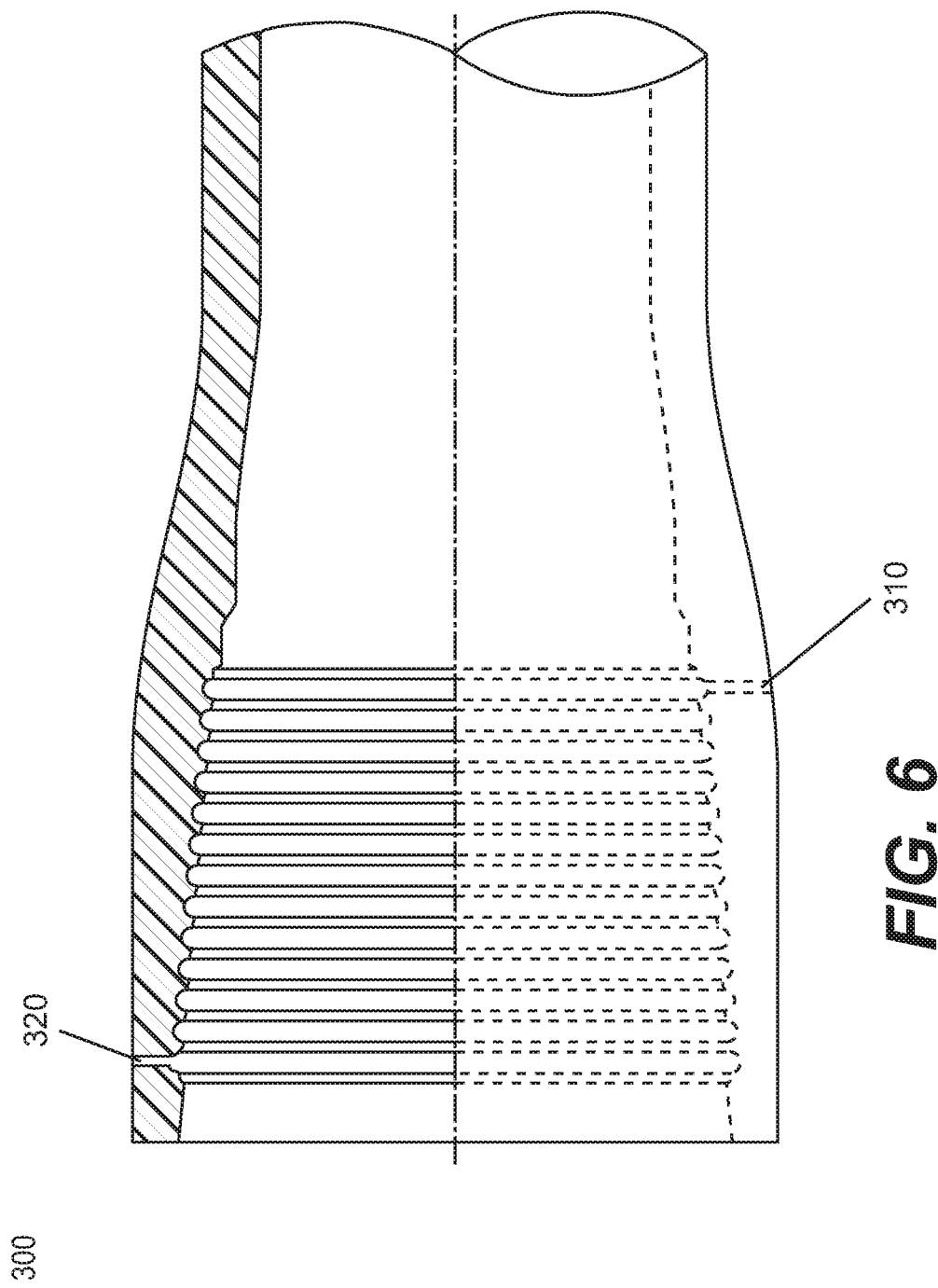
FIG. 6 is an illustrative example of placement of injection holes.
Figure 7:
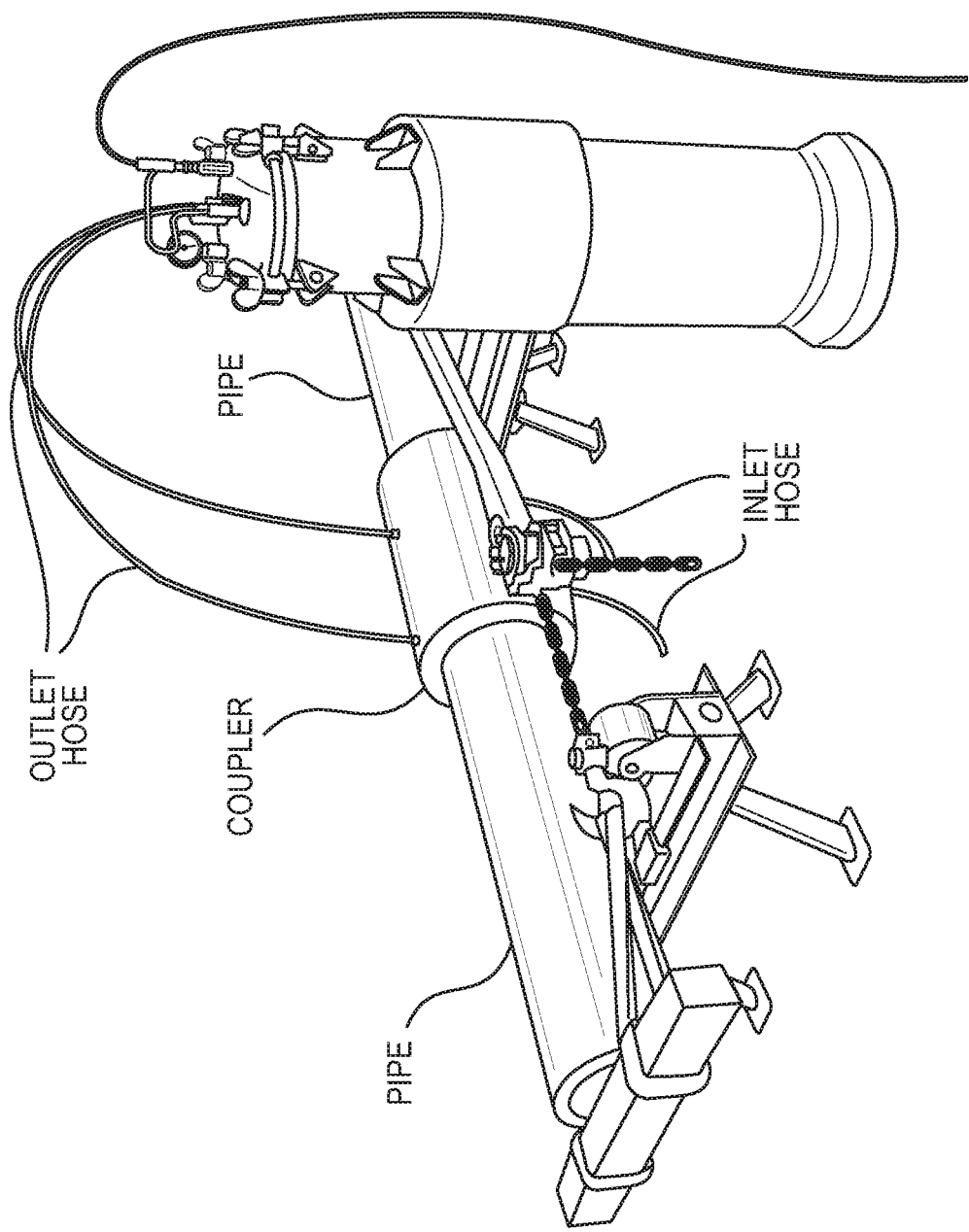
FIG. 7 depicts an example configuration of connections for an example injection procedure.
Figure 8:
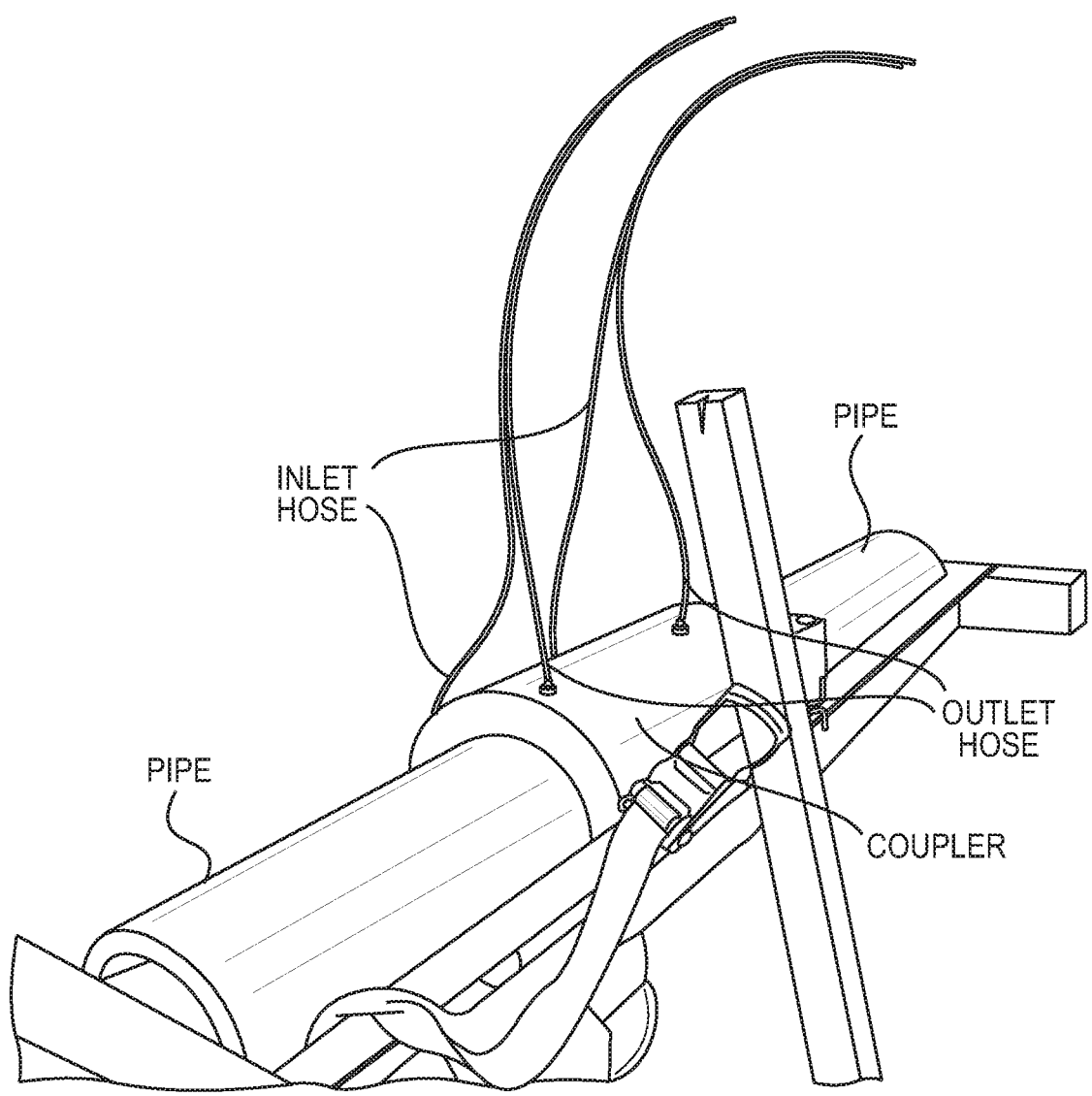
FIG. 8 depicts an example of a completed injection.

An example step-by-step procedure for injected mechanical joint injection includes the following:
1) Before starting the injection activities, dry-fit the spigot and socket (without an 'O' ring on the spigot) to ensure correct assembly.
2) Mark the inlet and outlet injection holes 310 and 320, respectively, on the socket 300 in such a way that they are around 45° to 180° apart from one another and also so that one hole is at the beginning of the groves grooves and the other hole is at the end of the grooves, as shown in FIG. 6 illustrating the socket 300. Any tolerances for the placement of the holes do not have to be limiting, and the placement of the inlet hole 310 may be in various positions. The outlet hole 320 may be in the highest possible position to ensure that the joint fills up completely.
3) Drill the inlet and outlet injection holes 310 and 320, respectively. A 5 mm drill bit may be used initially, followed by a 10 mm drill bit. If the drilling is carried out directly with 10 mm bit, the chance of damaging the inner diameter (ID) of the socket is higher. If a 5 mm drill bit is not available, then 4 mm or 6 mm or other similar diameter drill bits can be used.
4) After drilling, clean up the drilled hole from the inner diameter of the socket using suitable means so that there are no loose fibers or restrictions present. Suitable means include, without limitation, emery or sand paper. For example, a rough emery paper may be used to remove the majority of the fibers, and to smooth the surface. A second, finer, emery paper may then be used to smooth out the surface further. Any combination and types of emery paper or other cleaning or smoothing methods may be used, along with common sense and good workmanship to yield a clean hole suitable for further processes.
5) Tap the drilled hole with a ¼" to ⅜" National Pipe Thread Tapered Thread (NPT) tap set. Other tap sets or thread taps may be used, as long as an air-tight seal is achieved. The relationship between the tap set and drilled hole size may be similar as for other steel, fiberglass, or other pipe configurations.
6) Clean the inlet and outlet injection connections using compressed gas.
7) Mount the o-ring on the spigot and apply lubrication on top of the o-ring as well as the seating area of the socket. The o-ring may be made of rubber or other suitable material, compatible with the material to flow through the pipe. For water applications, EPDM rubber compound may be preferred. The placement of the o-ring may be at the front of the spigot, but may vary depending on the interior and exterior dimensions and design of the pipes to be fitted, as well as the size of the o-ring.
8) Assemble the joint and restrain it to avoid any movements using suitable cargo lashing belt(s) or come-along jack(s). Other suitable restraints may be used, so that the joint may be pulled together and tight, but in a manner that does not impede the injection holes.
9) Apply silicone or any other suitable sealant on the outside edge of the joint between the spigot and socket. Other suitable sealants include other silicone-based sealants, polyester-based sealants, polyester sealing compound, etc., including many commercially available compounds. Allow the sealant to cure.
10) Apply Teflon tape or other suitable tape on a'/4" to ⅜" tail fitting and connect it to the inlet and outlet injection holes. Other tapes and tail fitting materials may be used, particularly if cost or on-hand materials are considered, so long as an air-tight connection is achieved.
11) Cut suitable lengths of flexible hose to make appropriate connections from the inlet hole to the injection material bucket and from the outlet to the pressure differential chamber. In one example, polyethylene or nylon tube of ¼" or 7/16" inch diameter may be used, although other materials and dimensions would also be appropriate and again, may be chosen with cost and on-hand material considerations. Some slack should be provided by the length of hose or tubing, as suggested by the figures.
12) Two connections should be prepared on the pressure differential chamber. As shown in FIG. 7, one connection 410 is for the inlet to the socket from the pressure differential chamber, and a second connection 420 is for the pressure hose. The size of the connections are ⅜". An exemplary configuration 400 of completed connections on a joint with a coupler 430 around a pipe 440 is further shown in FIG. 7. The considerations for these connections may be similar to that of step 11.
13) Before carrying out the injection, the pressure seal of the joint is checked. This is done by connecting the compressed gas supply/vacuum line to the joint, thereby creating a pressure differential with the outside air. The joint is left with the pressure differential for 10 minutes. If there is any drop in pressure/vacuum, the joint is checked for leakage. Notably, injection cannot be performed if there is leakage. Leakage will typically occur due either to a damage o-ring, or due to leaks in the sealant. If there is leakage, the silicone sealant layer is re-sealed. If this does not solve the problem, then the o-ring is likely not sealing and the joint(s) should be disassembled and checked prior to re-assembly using steps 1-13, as appropriate.
14) Once the joint passes the pressure/vacuum test, the injection material is prepared. In this non-limiting example, the injection material comprises of 100 parts of epoxy resin, 24 parts of IPD mixture and 31 parts of milled glass fiber. To ensure that the materials are mixed well, the milled glass can be added in small quantities, such as handfuls at a time, to the epoxy resin and mixed well until the entire quantity of milled glass is mixed thoroughly with the resin. Then, IPD may be added and the mixture again mixed. Any mixing device may be used, including industrial or more rudimentary mixers, for example, a propeller attached to a drill, a small stick, etc.
15) Once the injection material comes out through the outlet injection line, stop the flow of injection material, and close the injection outlet valve 112, shown in FIGS. 4A-4C. As shown in FIG. 8, a pipe 530 and a coupler 540 are assembled for removal of the outlet hose connection 510 and for tying down the inlet and outlet hose connections 520 and 510, respectively, together. For example, tape may be used to fix the hoses in position.

16) After the injection is cured at ambient temperature, remove the inlet and outlet injection connections 520 and 510, respectively, from the joint and post cure the joint. The curing time may be affected by several factors, and may for example, take two to three hours using a heating blanket. The joint may also be post cured using a heating blanket or other suitable mechanism, and the restraint removed after the post cure.

In the above examples, the outlet hole 550 is positioned on the top of the press-fit pipes and the inlet hole (not shown) is at 45° to 180° apart from the outlet hole 550. However, the holes may be positioned in a number of alternate configurations. For example, the inlet or injection hole (not shown) may be positioned on the top of the press-fit pipes, while the outlet hole 530 is positioned on the bottom of the press-fit pipes. In other configurations, it may be desired for both the inlet or injection hole (not shown) and the outlet hole 550 to be positioned on the top or the bottom of the press-fit pipes. Furthermore, depending on the diameter of the pipe, multiple inlet and/or outlet holes might be used. Accordingly, placement, number of holes and further procedural steps necessary to achieve the various possible configurations of the bored holes may vary.

Example 5

Figure 9:
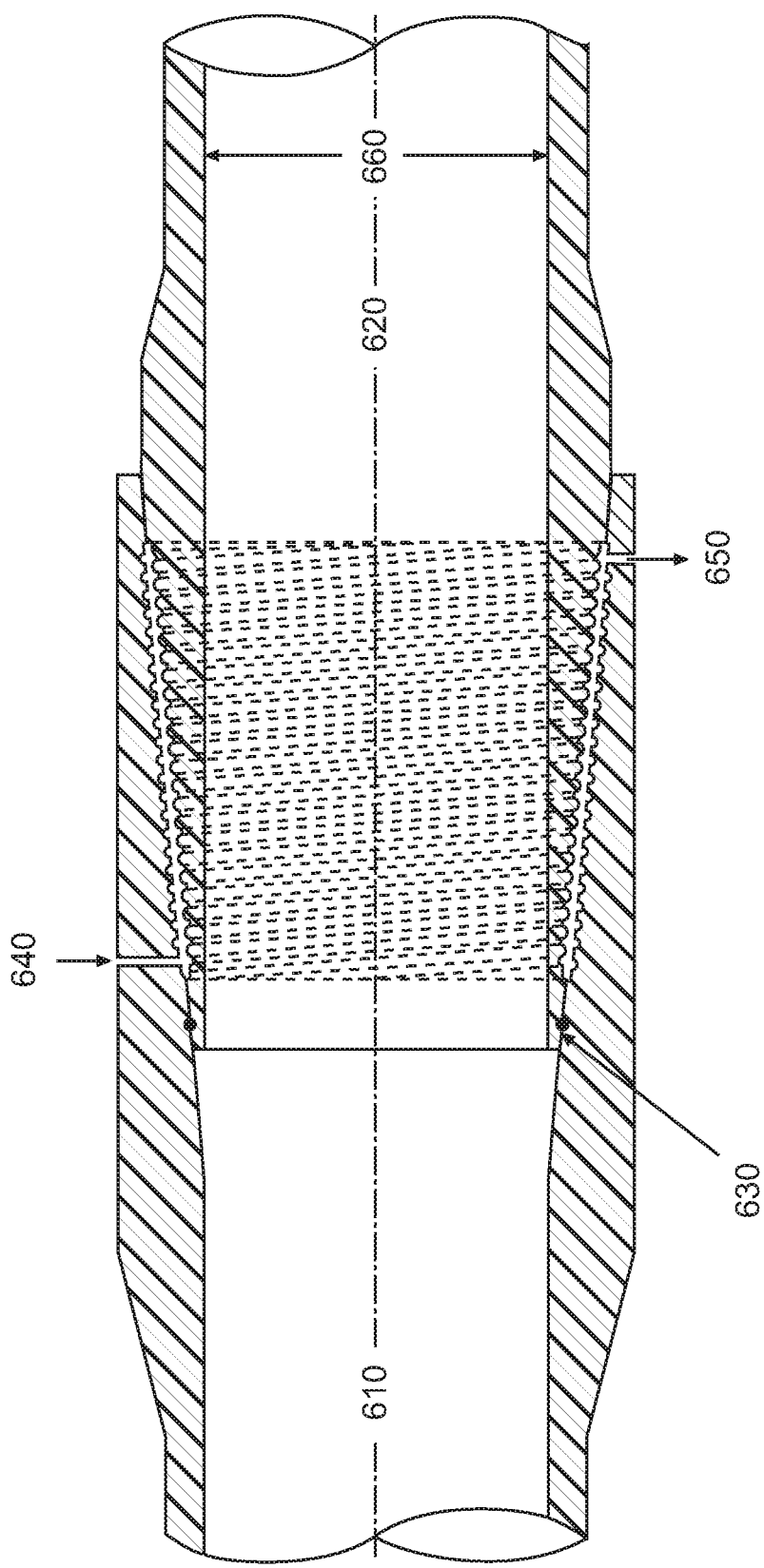
FIG. 9 is a cross-sectional view of an example injected mechanical joint for high pressure applications.

FIG. 9 is a cross-sectional view of an example injected mechanical joint 600 for high pressure applications. A first pipe having a receiving "Box end" 610, bell or socket (female) part and a second pipe having a mating "Pin end" 620 or spigot (male) part are push-fit together. Sealing therebetween is made by an o-ring or an adhesive 630, for example epoxy, polyester, vinylester, methyl acrylate, etc. adhesives, among others. Holes are pre-bored in the first pipe to provide for a vacuum infusion or injection "IN" 640 and vacuum infusion or injection "OUT" 650. As seen in FIG. 9, the "DN" value is given by the inner diameter 660 of the second pipe.

Example 6

Figure 10C:
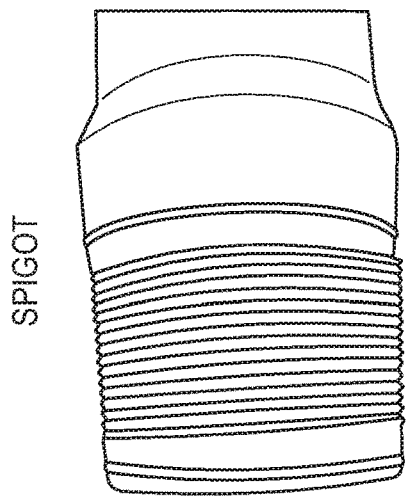
FIG. 10C illustrates a finished spigot.
Figure 10F:
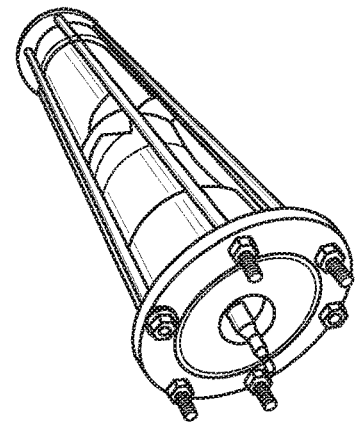
FIG. 10F illustrates testing the failure of a pipe assembly under pressure.
Figure 10B:
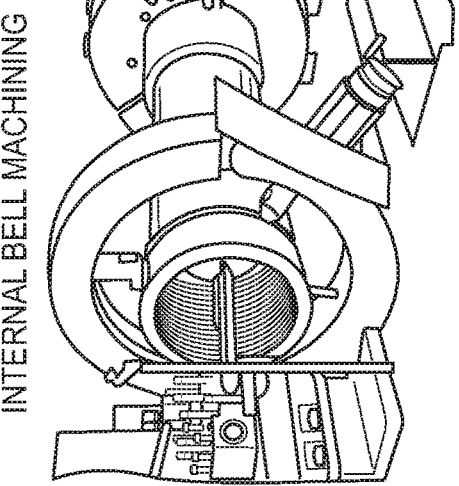
FIG. 10B illustrates bell-shaped machining of a pipe.
Figure 10E:
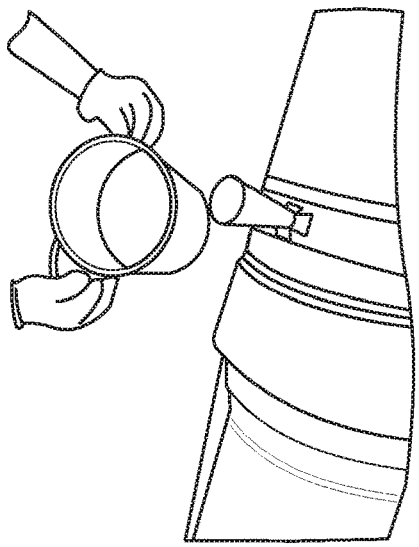
FIG. 10E illustrates an injected a mechanical joint.
Figure 10A:
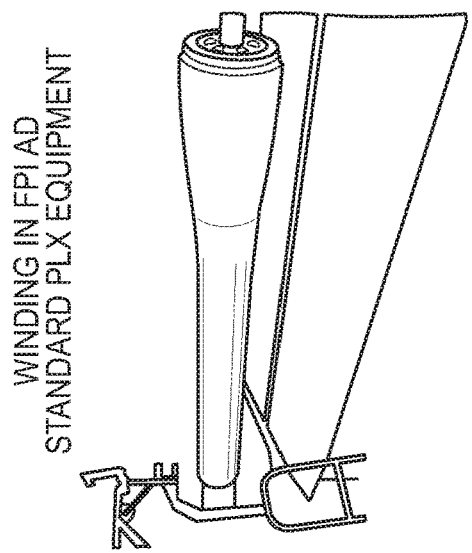
FIG. 10A illustrates winding of a pipe.
Figure 10D:
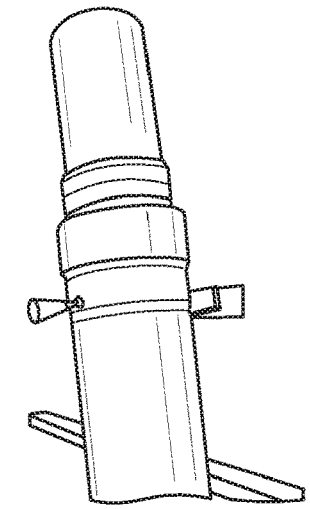
FIG. 10D illustrates a mated pipe and spigot.

FIGS. 10A-10F show steps in an example manufacturing and jointing process to achieve a DN300 PN160 fiberglass pipe having an integral injected mechanical joint. These steps include: winding on standard production equipment to create a general pipe shape, as shown in FIG. 10A; internal bell machining to create the interior bell shape, as shown in FIG. 10B; a finished spigot, as shown in FIG. 10C; mating of the belled pipe with the spigot via push-fit assembly and without heavy machinery, as shown in FIG. 10D; injection of the joint by vacuum and gravity, as shown in FIG. 10E; and final testing, as shown in FIG. 10F. It is noted that in case the vacuum assisted injection employed, the vacuum is used to remove the air from the cavities and suck the resin mixture or joining compound into the cavities. Then, once the resin is inside the cavities, gravity pulls the resin mixture or joining compound to the lowest point of the cavities such that the top-to-bottom injected mixture or compound fills the cavities completely. Testing is performed with internal pressures as described in international standards, such as ASTM D1598, ASTM D1599, API 15 HR, API 15 LR, and ISO 14692, among others.

Example 7

FIGS. 11A-11F show steps in an example manufacturing and jointing process to achieve a DN600 PN80 fiberglass pipe having a coupler injected mechanical joint. In this configuration, two pipes, each having a spigot 710, are machined, to mate with a matching molded coupler 720. Again, push-fit assembly is used, not requiring heavy machinery, prior to vacuum injection to result in securely jointed and coupled pipes. It may be noted that this assembly may result in double the number of o-rings and/or adhesive positions of other configurations, and for this reason may not be preferred for certain applications. An increased plurality of bored holes may be contemplated in this configuration, to increase the flow of joining compound between the pipes 730 and the coupler 720.

Achievable specifications of joinable fiberglass pipes resulting from the described systems and methods include, without limitation, a diameter of 100 to 1000 mm, pressure of 200 to 50 bar, and ability to withstand temperatures up to about 95° C. Other types of joinable fiberglass components include pipe plus joint, coupler, flange, elbow and tees. Diameters larger than DN1000 or 1000 mm and temperatures higher than 95° C. are also feasible with the described systems and methods.

Injected Joint Testing

A standardized approach for verification and qualification testing for injected joint High Pressure projects can be utilized with the present subject matter. This approach is derived from general test requirements as outlined in the international standards listed in Table 3, for example, ASTM D1598 and ASTM D1599.

Accordingly, the verification tests make use of non-standardized test methods aimed at generating as much information as possible from a limited number of tests. Generally, the verification test results are aimed at estimating whether the product will be able to meet the conditions required for qualification testing. Meanwhile, the qualification tests are aimed at generating qualification test data that can be used within commercial projects at a later stage.

Both the verification and qualification test stages are described in more detail below. For each test, the o-ring comprised NBR rubber or EPDM rubber. Additionally, for each test the injected joining compound comprised a mixture of epoxy resin, hardener and filler, in particular, the injected joining compound comprised 100 parts (by weight) of bisphenol-A (BPA) epoxy resin, 24 parts IPD hardener (Evonik Degussa VESTAMIN® IPD Epoxy Curing Agent may be used, among others) and 31 parts of milled glass filler.

Verification Testing

The following non-standard verification test procedures are used for qualification of High Pressure: A) Step-Burst Testing; and B) 100 hrs Survival Testing. For both procedures, the tests are commonly executed at ambient temperature, but they can also be executed at elevated temperature.

Example Step-Burst Test Procedure
1) Assemble the spool and ensure adequate safety measures are in place.
2) Fill the spool with water and ensure that all air is removed from the spool and connect the pumping equipment.
3) Pressurize the spool to the design pressure (PN), of the test spool in bars) at a steady rate, which may be typically PN/10 to PN/5 bars/min.
4) Once the spool is pressurized, hold the test pressure steady for 5 minutes.
5) After 5 minutes, increase the pressure by 0.5×PN at the same steady rate as discussed in step 3).
6) Repeat steps 4) & 5) until failure occurs.
7) Record failure pressure.

8) Record failure mode.

The results of the Step-Burst Test are generally used as a first estimate on whether the spool is capable of withstanding the test conditions required in the qualification tests. The target for the Step-Burst test pressure is typically a minimum of 3×PN.

Example 100 Hrs Survival Testing Procedure
1) Assemble the spool and ensure adequate safety measures are in place.
2) Fill the spool with water and ensure that all air is removed from the spool and connect the pumping equipment.
3) Pressurize the spool to the design pressure (PN) at a steady rate.
4) Once the spool is pressurized to PN, hold the pressure steady for 5 minutes.
5) After 5 minutes, increase the pressure to 1.5×PN at the same steady rate.
6) Hold the pressure steady for 5 minutes.
7) After the 5 minutes, increase the pressure to 2.1×PN at the same steady rate.
8) Maintain this test pressure for 100 hrs.
9) If successful, increase pressure by 0.2×PN.
10) Repeat steps 8) & 9) until failure occurs.
11) Record failure pressure and time-to-failure.
12) Record failure mode.

The results of the 100 hrs Survival Test are generally used to estimate whether the spool is capable of withstanding the test conditions required in the qualification tests. The target for the 100 hrs test pressure is typically a minimum of 2.3×PN.

Qualification Testing

For qualification of High Pressure joints 1,000 hrs survival testing in-line with ASTM D1598 is executed. The test temperature is the design temperature of the project and the test pressure has been standardized to 2.1×PN. To standardize, testing is usually carried out at either 65° C. or 95° C. as these test temperatures cover the majority of client requirements. In reality the 1,000 hrs test pressures will fluctuate depending on client, specification and/or project requirements. For development projects, the test pressure has been standardized to 2.1×PN as it covers the majority of client requirements.

Example 1,000 hrs Survival Testing Procedure
1) Assemble the spool and ensure adequate safety measures are in place.
2) Fill the spool with water and ensure that all air is removed from the spool and connect the pumping equipment.
3) Allow the spool to stabilize at the test temperature for 24-48 hrs.
4) Pressurize the spool to the design pressure (PN) at a steady rate.
5) Once the spool is pressurized, hold the pressure steady for 5 minutes.
6) After 5 minutes, increase the pressure to 1.5×PN at the same steady rate.
7) Once the spool is pressurized, hold the pressure steady for 5 minutes.
8) After 5 minutes, increase the pressure to 2.1×PN at the same steady rate.
9) Maintain this test pressure for 1,000 hrs.
10) If successful, increase pressure by 0.2×PN.
11) Repeat steps 9) & 10) until failure occurs.
12) Record failure pressure and time-to-failure.
13) Record failure mode.

In the above test procedure examples, water is used as it is typically a readily accessible fluid medium, while also being an aggressive medium for fiberglass pipe. However, other fluid media is contemplated and may be used instead of, or in addition to water.

Injected Joint Test Results

To date, the development of the injected joint has successfully passed the verification test stage; the qualification test stage is ongoing. Some of the results obtained so far are highlighted in Tables 8 and 9.

TABLE 8

Verification testing

| # | DN (mm) | PN (bar) | Test Type | Temp (° C.) | Results |
|---|---------|----------|-----------|-------------|---------|
| 1 | 150 | 150 | Burst | ambient | 560 bar |
| 2 | 200 | 200 | Burst | ambient | 690 bar |
| 3 | 600 | 80 | Burst | ambient | 210 bar |
| 4 | 100 | 150 | Survival | 65 | 400 bar for 100 hrs |
| 5 | 100 | 150 | Survival | 95 | 300 bar for 100 hrs |
| 6 | 200 | 150 | Survival | 65 | 300 bar for 100 hrs |
| 7 | 200 | 150 | Survival | 95 | 325 bar for 100 hrs |
| 8 | 300 | 100 | Survival | 65 | 300 bar for 100 hrs |
| 9 | 600 | 80 | Survival | 65 | 200 bar for 100 hrs |
| 10 | 600 | 80 | Survival | 95 | 200 bar for 100 hrs |

TABLE 9

Qualification testing

| # | DN (mm) | PN (bar) | Test Type | Temp (° C.) | Target | Status |
|---|---------|----------|-----------|-------------|--------|--------|
| 1 | 200 | 150 | Survival | 65 | 350 bar for 1,000 hrs | Completed 1,028 hrs |
| 2 | 200 | 200 | Survival | 65 | 400 bar for 1,000 hrs | Completed 1,007 hrs |
| 3 | 200 | 200 | Survival | 95 | 350 bar for 1,000 hrs | Completed 1,003 hrs |
| 4 | 300 | 150 | Survival | 65 | 350 bar for 1,000 hrs | Completed 1,008 hrs |
| 5 | 300 | 150 | Survival | 95 | 300 bar for 1,000 hrs | Completed 1,007 hrs |
| 6 | 600 | 80 | Survival | 65 | 180 bar for 1,000 hrs | Completed 1,003 hrs |
| 7 | 600 | 80 | Survival | 95 | 180 bar for 1,000 hrs | Completed 1,010 hrs |

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the subject matter, may be made by those skilled in the art within the principal and scope of the subject matter as expressed in the appended claims.

The invention claimed is:

1. A system of jointing reinforced thermosetting resin (RTR) pipe, comprising:
- a first RTR pipe having a first spigot portion, the first spigot portion including a first joining surface, wherein a portion of the first joining surface comprises external grooves;
- a second RTR pipe having a second spigot portion, the second spigot portion having a second joining surface, wherein a portion of the second joining surface comprises external grooves;
- a coupler having a first socket portion at a first end and a second socket portion at a second end, wherein a portion of the first end and the second end comprises internal grooves, wherein a wall thickness of the coupler increases from each end to a center portion having a maximum wall thickness;
- a first cavity between a portion of the first joining surface and the first socket portion, the first cavity formed when the first spigot portion is push-fit into the first socket portion and abuts the internal joining surface of the first socket portion of the coupler;
- a second cavity between a portion of the second joining surface and the second socket portion, the second cavity formed when the second spigot portion is push-fit into the second socket portion and abuts the internal joining surface of the second socket portion of the coupler;
- an injectable/curable material located in the first and second cavity; and
- a resistance wire applied to at least one of the first joining surface and the second joining surface, wherein the first joining surface and the second joining are mating surfaces.

2. The system of jointing of claim 1, further comprising a first sealing element forming a seal between the first pipe and the second pipe.

3. The system of jointing of claim 1, wherein:
- the injectable/curable material is an injectable joining compound, wherein the injectable joining compound is injected in a hole in a top portion of the socket portion of the second pipe, thus filling the cavity formed by the first joining surface and the second joining surface.

4. The system of jointing of claim 1, wherein the internal grooves of the internal joining surface of the first spigot portion align with the external grooves of the external joining surface of the first socket portion to form the first cavity extending between the first joining surface and the second joining surface; and
- wherein the internal grooves of the internal joining surface of the second spigot portion align with the external grooves of the external joining surface of the second socket portion to form the second cavity extending between the first joining surface and the second joining surface.

* * * * *